United States Patent [19]

Sekiguchi et al.

[11] Patent Number: 5,414,569
[45] Date of Patent: May 9, 1995

[54] MAGNETIC RECORDING APPARATUS WITH SELECTIVE RECORDING OF AUXILIARY AUDIO SIGNAL

[75] Inventors: Masami Sekiguchi; Toru Yamamoto, both of Kanagawa, Japan

[73] Assignee: Sony Corporation, Tokyo, Japan

[21] Appl. No.: 298,536

[22] Filed: Aug. 3, 1994

Related U.S. Application Data

[63] Continuation of Ser. No. 955,525, Oct. 1, 1992, abandoned.

[30] Foreign Application Priority Data

Oct. 4, 1991 [JP] Japan .................. 3-257925

[51] Int. Cl.6 .............................................. G11B 5/02
[52] U.S. Cl. ......................................... 360/19.1; 360/30; 360/24; 358/343
[58] Field of Search ................. 360/19.1, 22, 24, 30, 360/61, 13, 18; 358/341, 343, 143, 144; 369/2, 4

[56] References Cited

U.S. PATENT DOCUMENTS

| | | | |
|---|---|---|---|
| 3,778,558 | 12/1973 | Wick et al. | 360/13 |
| 4,583,132 | 4/1986 | Nakano et al. | 358/341 X |
| 4,630,134 | 12/1986 | Kanamaru | 360/19.1 X |
| 4,641,204 | 2/1987 | Sugiyama | 358/341 |
| 4,964,000 | 10/1990 | Kanota et al. | 360/19.1 X |
| 4,965,674 | 10/1990 | Nagasawa et al. | 360/19.1 X |
| 5,003,407 | 3/1991 | Nakano et al. | 360/19.1 |
| 5,121,259 | 6/1992 | Yamashita | 360/19.1 |
| 5,191,487 | 3/1993 | Nakamura et al. | 360/19.1 |

*Primary Examiner*—Andrew L. Sniezek
*Attorney, Agent, or Firm*—Robert P. Biddle; Jerry A. Miller; Lise A. Rode

[57] ABSTRACT

An 8-mm video tape recorder receives a main audio signal which is transmitted as a monaural or stereophonic audio signal, and an auxiliary audio signal (SAP) which is selectively transmitted with the main audio signal, and records the main audio signal as first and second audio signals. A SAP demodulator determines whether the auxiliary audio signal is transmitted or not. When the auxiliary audio signal is transmitted as determined by the SAP demodulator and recording of the auxiliary audio signal is indicated through a terminal by the user, selector switches are shifted to supply the auxiliary audio signal to a frequency demodulator which records the auxiliary audio signal as the first audio signal on an 8-mm magnetic video tape. The 8-mm video tape recorder can record video signals accompanied by audio signals at all times.

6 Claims, 1 Drawing Sheet

MAGNETIC RECORDING APPARATUS WITH SELECTIVE RECORDING OF AUXILIARY AUDIO SIGNAL

This is a continuation of application(s) Ser. No. 07/955,525 filed on Oct. 1, 1992, which is hereby abandoned and incorporated by reference.

BACKGROUND OF THE INVENTION

Field of the Invention

The present invention relates to a magnetic recording apparatus such as a video tape recorder suitable for recording television broadcasts in the United States of America, for example.

Description of the Prior Art

Television program broadcasts in the United States of America, for example, are transmitted with video signals and audio signals which include a monaural or stereophonic main audio signal and an auxiliary audio signal known as SAP (Second Audio Program). These main and auxiliary audio signals are used typically for bilingual speech signal transmission. For example, the main audio signal is used to transmit program audio information in English through monaural or stereophonic channels (two channels), and the auxiliary audio signal (SAP) is used to transmit program audio information in Spanish, French, or any of other non-English languages.

Presently available 8-mm video tape recorders record, as audio information, only first and second audio signals by way of so-called AFM. Therefore, when a television program broadcast is transmitted with a stereophonic main audio signal (two channels) and an auxiliary audio signal (SAP), the conventional 8-mm video tape recorders can record not all these transmitted audio signals.

If the auxiliary audio signal (SAP) is dedicated to the transmission of program audio information in Spanish, French, or any of other non-English languages, then English-speaking viewers of television program broadcasts usually find the auxiliary audio signal (SAP) unnecessary. Conversely, the main audio signal is often disregarded by non-English-speaking viewers of television program broadcasts.

It has been customary to provide the 8-mm video tape recorder with a switch for selecting a SAP recording mode for recording the auxiliary audio signal (SAP). When the switch is operated on to select the SAP recording mode, the 8-mm video tape recorder records only the auxiliary audio signal (SAP) as well as the video signal. However, in the absence of any auxiliary audio signal (SAP) in a transmitted television program broadcast, only noise is recorded as audio information by the 8-mm video tape recorder, and hence a video signal with no program audio signal is recorded by the 8-mm video tape recorder. Consequently, when the recorded video signal is reproduced, it is highly likely for the user to think that the audio system of the 8-mm video tape recorder is malfunctioning because no audio information is reproduced.

Beta and VHS video tape recorders are capable of recording first and second audio signals by way of AFM and also an audio signal through a fixed head. Therefore, the Beta and VHS Video tape recorders are free of the above problems as they can record a stereophonic main audio signal (two channels) and an auxiliary audio signal (SAP).

OBJECTS AND SUMMARY OF THE INVENTION

It is an object of the present invention to provide a magnetic recording apparatus which can record a video signal that is always accompanied by an audio signal.

According to the present invention, there is provided a magnetic recording apparatus comprising receiving means for receiving a main audio signal which is transmitted as a monaural or stereophonic audio signal, and an auxiliary audio signal which is selectively transmitted with the main audio signal, recording means for recording the main audio signal as first and second audio signals, determining means for determining whether the auxiliary audio signal is transmitted or not, indicating means for indicating recording of the auxiliary audio signal, and control means for controlling the recording means to record the auxiliary audio signal as the first audio signal when the auxiliary audio signal is transmitted as determined by the determining means and recording of the auxiliary audio signal is indicated by the indicating means.

The recording means comprises a pair of frequency modulators for modulating respective different carriers with the main audio signals thereby to produce the first and second audio signals, and means for recording the first and second audio signals.

The control means comprises switch means for selectively applying either the main audio signal or the auxiliary audio signal to the recording means, and means for applying the auxiliary audio signal to the recording means in response to a signal from the determining means indicating the transmission of the auxiliary audio signal and a signal from the indicating means indicating the recording of the auxiliary audio signal.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

The sole FIGURE is a block diagram of a magnetic recording apparatus according to the present invention.

DETAILED DESCRIPTION OF THE PREFERRED EMBODIMENT

Figure 1:
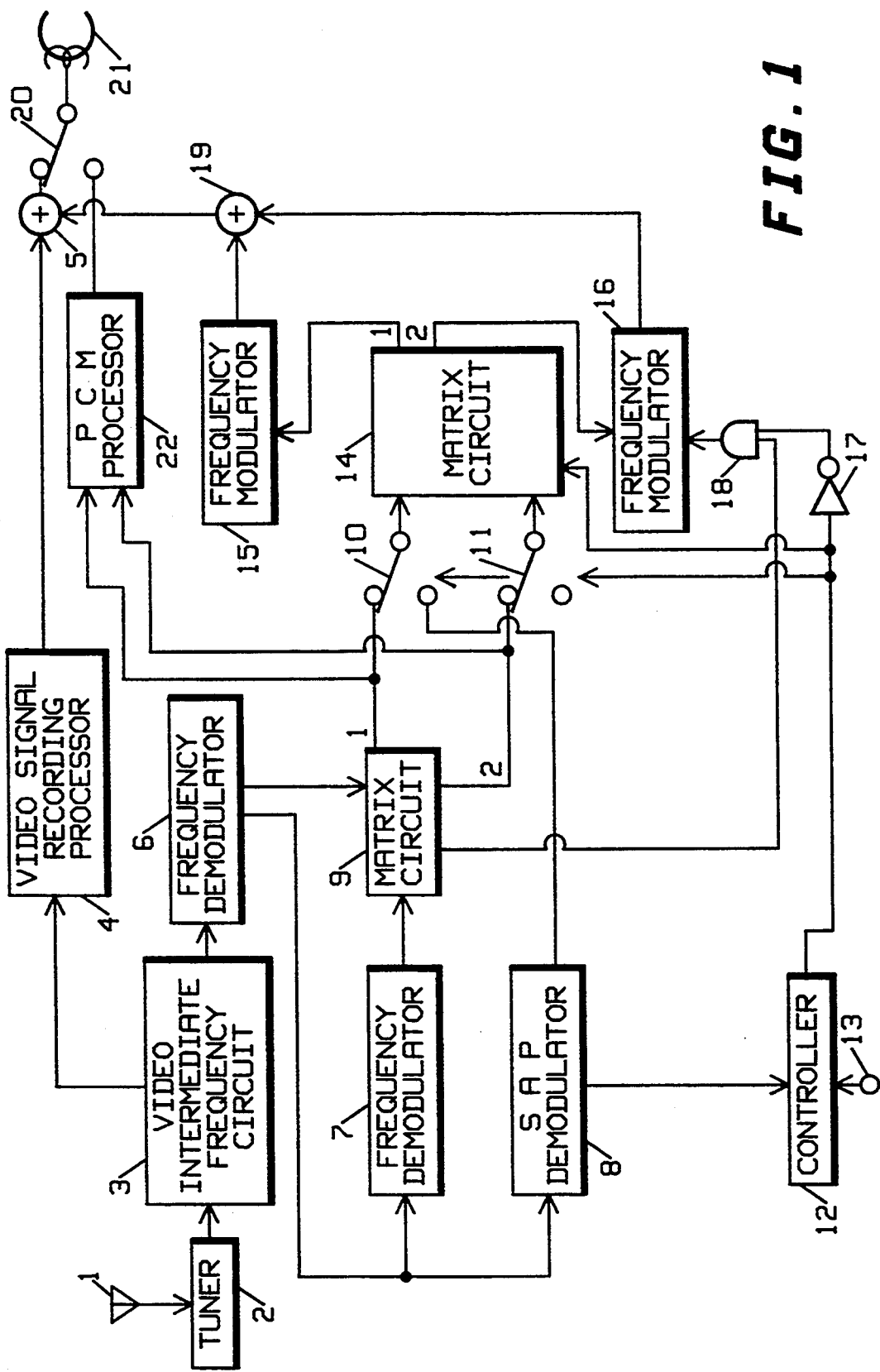

A magnetic recording apparatus as shown in the figure is typically in the form of an 8-mm video tape recorder. In the 8-mm video tape recorder, television program broadcast signals transmitted from various television broadcasting stations are received by an antenna 1 and supplied to a tuner 2 which selects a desired one of the received television program broadcast signals. The selected television program broadcast signal is supplied from the tuner 2 to a video intermediate frequency circuit 3, which produces and applies a video intermediate frequency signal to a video signal recording processor 4. The video signal recording processor 4 supplies a processed video signal to an adder 5.

The video intermediate frequency circuit 3 also produces an audio intermediate frequency signal that is supplied to a frequency demodulator 6. The frequency demodulator 6 demodulates the supplied signal into a monaural audio signal or the sum (L+R) of stereophonic left- and right-channel audio signals. The signal from the frequency demodulator 6 is supplied to a frequency demodulator 7 which produces the difference (L−R) between stereophonic left- and right-channel audio signals. The signal from the frequency demodulator 6 is also supplied to an auxiliary audio signal (SAP) demodulator 8 which produces an auxiliary audio signal (SAP).

The demodulated signals from the frequency demodulators 6, 7 are applied to a matrix circuit 9. The matrix circuit 9 is also supplied with a signal indicating that a difference signal (L−R) is being transmitted from the frequency demodulator 7. When no difference signal (L−R) is being transmitted from the frequency demodulator 7, the demodulated signal from the frequency demodulator 6 is obtained from first and second terminals of the matrix circuit 9. When a difference signal (L−R) is being transmitted from the frequency demodulator 7, stereophonic left- and right-channel audio signals L, R are obtained respectively from the first and second terminals of the matrix circuit 9.

The signal from the first terminal of the matrix circuit 9 is supplied to one of two fixed contacts of a selector switch 10, and the signal from the second terminal of the matrix circuit 9 is supplied to one of two fixed contacts of a selector switch 11. The demodulated SAP signal from the auxiliary audio signal (SAP) demodulator 8 is supplied to the other fixed terminal of the selector switch 10. No signal is supplied to the other fixed terminal of the selector switch 11.

A signal indicating the transmission of the demodulated SAP signal from the auxiliary audio signal (SAP) demodulator 8 is supplied to a controller 12. The controller 12 is also supplied with a signal indicating whether the SAP signal is to be recorded or not, through a terminal 13. The controller 12 applies a control signal to shift the movable contacts of the selector switches 10, 11 to the other fixed contacts thereof only when the SAP signal is to be recorded and the transmission of the SAP signal is confirmed.

Signals that are obtained from the movable contacts of the selector switches 10, 11 are supplied to another matrix circuit 14. When the control signal from the controller 12 is not applied to the matrix circuit 14, the matrix circuit 14 produces the sum (L+R) of the signals from the selector switches 10, 11 from a first terminal thereof, and the difference (L−R) between the signals from the selector switches 10, 11 from a second terminal thereof. When the control signal from the controller 12 is applied to the matrix circuit 14, and hence the SAP signal is to be recorded and the transmission of the SAP signal is confirmed, the matrix circuit 14 is disabled, and it allows the signal from the selector switch 10 to be obtained from the first terminal thereof.

The signal from the first terminal of the matrix circuit 14 is supplied to a first frequency modulator 15 which modulates a carrier of 1.5 MHz with the supplied signal. The signal from the second terminal of the matrix circuit 14 is supplied to a second frequency modulator 16 which modulates a carrier of 1.7 MHz with the supplied signal. The signal indicating the transmission of the difference signal (L−R) from the frequency demodulator 7 and the control signal from the controller 12 as it is inverted by an inverter 17 are supplied to an AND gate 18 whose output signal is applied to the second frequency modulator 16. Therefore, the second frequency modulator 16 is enabled by the output signal from the AND gate 18 when the difference signal (L−R) is transmitted from the frequency demodulator 7 and also the SAP signal is not to be recorded or the transmission of the SAP signal is not confirmed. Frequency-modulated signals from the frequency modulators 15, 16 are added to each other by an adder 19, and the sum signal from the adder 19 is supplied to the adder 5. The adder 5 adds the video signal from the video signal recording processor 4 and the sum signal from the adder 19, and supplies the added video and audio signals through a switch 20 to a recording head 21. The recording head 21 records the supplied video and audio signals on an 8-mm magnetic video tape..

In the case where the 8-mm video tape recorder has a pulse code modulation (PCM) capability, then the signals from the first and second terminals of the matrix circuit 9 are supplied to a PCM signal processor 22 which pulse-code-modulates the supplied signals. The pulse-code-modulated signal is then supplied from the PCM signal processor 22 through the switch 20 to the recording head 21. The recording head 21 then records the supplied pulse-code-modulated signal in a PCM signal recording area on an 8-mm magnetic tape. The SAP signal is not pulse-code-modulated for recording because the SAP signal is of a narrow bandwidth and does not have a high quality which deserves the PCM recording, and also because compatibility should be maintained with existing 8-mm video tape recorders.

Audio signals which are supplied to the frequency demodulators 15, 16 when the SAP signal is to be recorded and not to be recorded are tabulated as follows:

| Received signals | When the SAP signal is to be recorded | | When the SAP signal is not to be recorded | |
| --- | --- | --- | --- | --- |
| | Freq Dem 15 | Freq Dem 16 | Freq Dem 15 | Freq Dem 16 |
| Mono | Mono | — | Mono | — |
| Mono + SAP | SAP | — | Mono | — |
| Stereo | L + R | L − R | L + R | L − R |
| Stereo + SAP | SAP | — | L + R | L − R |

When no audio signals are supplied to the frequency demodulator 16, the frequency demodulator 16 is disabled, and no carrier is generated thereby.

Since audio signals to be recorded by the 8-mm video tape recorder are controlled by the controller 12 depending on whether the SAP signal is transmitted or not as confirmed by the SAP demodulator 8, the 8-mm video tape recorder always records a video signal accompanied by an audio signal. Specifically, when the SAP signal is to be recorded as indicated by the signal applied from the terminal 13 to the controller 12, the SAP signal is recorded by the 8-mm video tape recorder if the SAP signal is transmitted, and the main audio signal is recorded by the 8-mm video tape recorder if no SAP signal is transmitted. When the SAP signal is not to be recorded as indicated by the signal applied from the terminal 13 to the controller 12, the main audio signal is always recorded by the 8-mm video tape recorder irrespective of whether the SAP signal is transmitted or not.

If the SAP signal is used for the transmission of program audio information in Spanish, French, or any of other non-English languages, then English-speaking viewers of television program broadcasts can record the main audio signal only by not selecting the recording of the SAP signal. Conversely, non-English-speaking viewers can select the recording of the SAP signal to record the SAP signal when the SAP signal is transmitted. However, the main audio signal is recorded when the SAP signal is not transmitted even if the recording of the SAP signal is selected.

While the present invention has been described with respect to 8-mm video tape recorders, the principles of the present invention are also applicable to Beta and VHS video tape recorders for better audio signal recording operation.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for recording a television signal which includes a video signal, a main audio program and may include a Second Audio Program (SAP), comprising:
   means for receiving said television signal and generating a processed video signal therefrom;
   a first demodulator for producing a sum audio signal including a sum of left and right stereo channels;
   a second demodulator, receiving said sum audio signal, for producing a difference audio signal including a difference of left and right stereo channels;
   matrix means for producing a matrix signal indicative of the presence of said difference audio signal;
   an SAP demodulator, also receiving said sum audio signal, for demodulating an SAP audio signal, and for determining if said television signal includes an SAP audio signal, said SAP demodulator producing a signal indicative of the presence of said SAP signal;
   control means responsive to said signal indicative of the presence of said SAP audio signal and responsive to an input signal indicating whether said SAP audio signal is to be recorded, for producing a control signal;
   a first frequency modulator for selectively modulating either said SAP audio signal or said sum audio signal to produced a first modulated audio output signal;
   a second frequency modulator for modulating said difference audio signal to produced a second modulated audio output signal;
   gating means, responsive to said control signal and said matrix signal for enabling operation of said second frequency modulator only when said difference audio signal is present;
   switching means, responsive to said control signal, for selectively switching either said SAP audio signal or said sum audio signal to said first modulator, and said difference audio signal to said second frequency modulator;
   combining means for combining said processed video signal with said first and second modulated audio output signals to produce a combined signal; and
   recording means for recording said combined signal on a recording medium.

2. The apparatus of claim 1, wherein said recording means includes a magnetic recording apparatus for recording on a magnetic recording medium.

3. The apparatus of claim 1, further comprising a PCM processor receiving said sum and difference audio signals for encoding with pulse code modulation for recording on said recording medium.

4. The apparatus of claim 1, wherein said first and second demodulators include frequency demodulators.

5. The apparatus of claim 1, wherein said receiving means includes a tuner coupled to a video intermediate frequency circuit.

6. An apparatus for recording a television signal which includes a video signal, a main audio program and may include a Second Audio Program (SAP), comprising:
   a tuner and intermediate frequency circuit for receiving said television signal and generating a processed video signal therefrom;
   a first frequency demodulator for producing a sum audio signal including a sum of left and right stereo channels;
   a second frequency demodulator, receiving said sum audio signal, for producing a difference audio signal including a difference of left and right stereo channels;
   matrix means for producing a matrix signal indicative of the presence of said difference audio signal;
   an SAP demodulator, also receiving said sum audio signal, for demodulating an SAP audio signal, and for determining if said television signal includes an SAP audio signal, said SAP demodulator producing a signal indicative of the presence of said SAP signal;
   control means responsive to said signal indicative of the presence of said SAP audio signal and responsive to an input signal indicating whether said SAP audio signal is to be recorded, for producing a control signal;
   a first frequency modulator for selectively modulating either said SAP audio signal or said sum audio signal to produced a first modulated audio output signal;
   a second frequency modulator for modulating said difference audio signal to produced a second modulated audio output signal;
   gating means, responsive to said control signal and said matrix signal for enabling operation of said second frequency modulator only when said difference audio signal is present;
   switching means, responsive to said control signal, for selectively switching either said SAP audio signal or said sum audio signal to said first modulator, and said difference audio signal to said second frequency modulator;
   combining means for combining said processed video signal with said first and second modulated audio output signals to produce a combined signal;
   a PCM processor receiving said sum and difference audio signals for encoding with pulse code modulation; and
   recording means including a magnetic recording head, for recording said pulse code modulated signal on a magnetic recording medium.

* * * * *